United States Patent
Himmelmann et al.

(10) Patent No.: US 10,738,695 B2
(45) Date of Patent: Aug. 11, 2020

(54) ELECTRICALLY BOOSTED REGENERATIVE BLEED AIR SYSTEM

(71) Applicant: Hamilton Sundstrand Corporation, Windsor Locks, CT (US)

(72) Inventors: Richard A. Himmelmann, Beloit, WI (US); Stephen E. Tongue, Hampden, MA (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 271 days.

(21) Appl. No.: 15/350,987

(22) Filed: Nov. 14, 2016

(65) Prior Publication Data
US 2018/0135513 A1    May 17, 2018

(51) Int. Cl.
| | |
|---|---|
| *F02C 6/08* | (2006.01) |
| *B64D 13/06* | (2006.01) |
| *F02C 7/32* | (2006.01) |
| *B64D 15/04* | (2006.01) |

(52) U.S. Cl.
CPC .............. *F02C 6/08* (2013.01); *B64D 13/06* (2013.01); *B64D 15/04* (2013.01); *F02C 7/32* (2013.01); *B64D 2013/0618* (2013.01); *B64D 2013/0648* (2013.01); *F05D 2220/323* (2013.01); *F05D 2220/62* (2013.01); *F05D 2220/76* (2013.01); *F05D 2270/06* (2013.01)

(58) Field of Classification Search
CPC ............ B64D 13/06; B64D 2013/0618; B64D 2013/0648; F02C 6/08; F02C 7/32; F02C 9/18; F05D 2220/62
See application file for complete search history.

(56) References Cited

U.S. PATENT DOCUMENTS

| | | | |
|---|---|---|---|
| 4,261,416 A | * | 4/1981 | Hamamoto ............ B64D 13/06 165/271 |
| 5,899,085 A | | 5/1999 | Williams |
| 6,189,324 B1 | | 2/2001 | Williams et al. |
| 6,545,373 B1 | | 4/2003 | Andres et al. |
| 6,796,527 B1 | | 9/2004 | Munoz et al. |
| 7,624,592 B2 | | 12/2009 | Lui et al. |
| 8,957,539 B1 | | 2/2015 | Ralston |

(Continued)

FOREIGN PATENT DOCUMENTS

| | | |
|---|---|---|
| EP | 1283166 A2 | 2/2003 |
| EP | 2960467 A1 | 12/2015 |

(Continued)

OTHER PUBLICATIONS

Extended European Search Report for Application No. 17201158.7-1007, dated Apr. 11, 2018 (7 pp.).

(Continued)

*Primary Examiner* — Scott J Walthour
(74) *Attorney, Agent, or Firm* — Cantor Colburn LLP

(57) ABSTRACT

An engine bleed air system for providing air to an aircraft system includes a port for extracting bleed air from a compressor section of an engine. The system additionally includes a turbo-generator having a turbine and a generator. The generator is driven by rotation of the turbine. A boost compressor is fluidly coupled to the port. Bleed air from the port is selectively provided to one of the turbo-generator and the boost compressor based on a demand of the aircraft system.

16 Claims, 5 Drawing Sheets

(56) References Cited

U.S. PATENT DOCUMENTS

| | | |
|---|---|---|
| 8,967,528 B2 | 3/2015 | Mackin et al. |
| 9,062,604 B2 | 6/2015 | Defrancesco |
| 2002/0158517 A1 | 10/2002 | Rouse et al. |
| 2007/0266695 A1* | 11/2007 | Lui ..................... B64D 13/06 60/204 |
| 2010/0314877 A1 | 12/2010 | Finney |
| 2013/0097992 A1* | 4/2013 | Suciu ..................... F02C 7/08 60/39.83 |
| 2014/0165588 A1 | 6/2014 | Snape et al. |
| 2014/0196469 A1 | 7/2014 | Finney et al. |
| 2016/0032841 A1 | 2/2016 | Ronan |
| 2016/0114894 A1 | 4/2016 | Schwartz et al. |
| 2017/0106985 A1* | 4/2017 | Stieger ................. H02K 7/1823 |
| 2018/0134397 A1 | 5/2018 | Himmelmann et al. |

FOREIGN PATENT DOCUMENTS

| | | |
|---|---|---|
| EP | 3002431 A1 | 4/2016 |
| WO | 2015026431 A1 | 2/2015 |

OTHER PUBLICATIONS

Extended European Search Report for Application No. 17201611. 5-1007, dated Apr. 11, 2018 (9 pp.).

\* cited by examiner

ELECTRICALLY BOOSTED REGENERATIVE BLEED AIR SYSTEM

BACKGROUND

This application relates to an aircraft, and more particularly, to a bleed air system for supplying air to one or more aircraft systems including an environmental control system.

Commercial aircrafts or jetliners typically employ an environmental control system to pressurize a passenger cabin of the aircraft and/or thermal anti-icing systems to provide heated air for anti-icing applications. Air supply to these systems is typically provided by bleed air extracted from or provided by a compressor of an aircraft engine.

To meet pressure and/or temperature demands of the various aircraft systems, bleed air is often extracted from a high stage of a low-pressure compressor of the aircraft engine. For example, bleed air is often extracted from an eighth stage compressor of an aircraft engine. The pressurized bleed air is then often cooled via a precooler and a pressure regulating valve prior to providing the bleed air to a system of the aircraft (e.g., environmental control system). Thus, a portion of the energy spent by the engine to produce the bleed air is wasted when cooling the bleed air via the precooler and reducing the pressure of the bleed air at the pressure regulating valve. This reduction in temperature and pressure dissipates the energy imparted to the bleed air by the engine without recovering it. This reduction in the efficiency of the bleed air system causes the engine to burn more fuel, thereby reducing the aircraft's overall fuel efficiency.

SUMMARY

Disclosed herein is an engine bleed air system for providing air to an aircraft system includes a port for extracting bleed air from a compressor section of an engine. The system additionally includes a turbo-generator having a turbine and a generator. The generator is driven by rotation of the turbine. A boost compressor is fluidly coupled to the port. Bleed air from the port is selectively provided to one of the turbo-generator and the boost compressor based on a demand of the aircraft system.

Also disclosed herein is a method of operating a bleed air system of an aircraft including determining a demand of one or more aircraft systems, extracting bleed air from an engine via a port, providing the bleed air to a turbo-generator if an energy of the bleed air is greater than the demand of the one or more aircraft systems, and providing the bleed air to a boost compressor if the energy of the bleed air is less than the demand of the one or more aircraft systems.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed system is presented herein by way of exemplification and not limitation with reference to the Figures. It is to be understood that other embodiments may be utilized and changes may be made without departing from the scope of the present disclosure.

Figure 1:
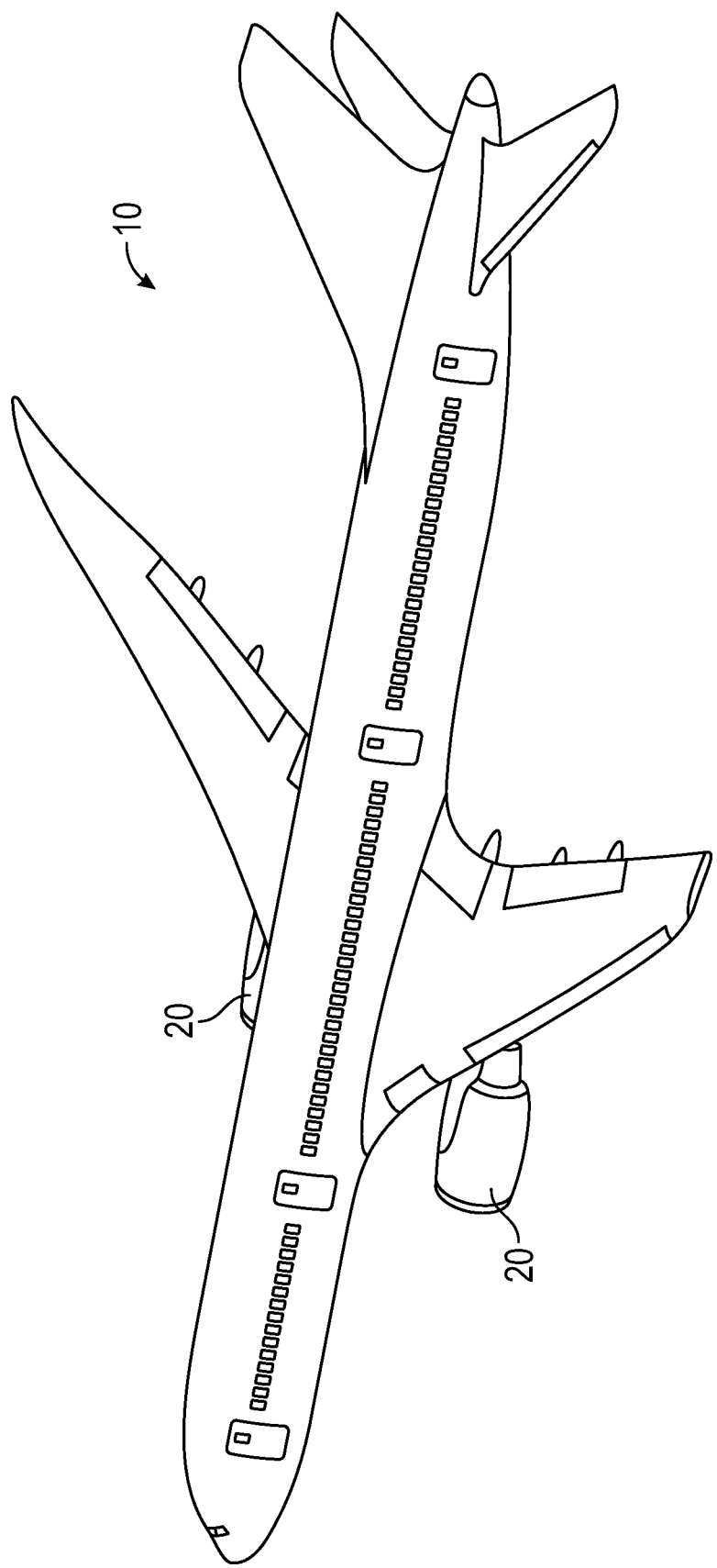
FIG. 1 is an example of an aircraft having one or more engines.
Figure 2:
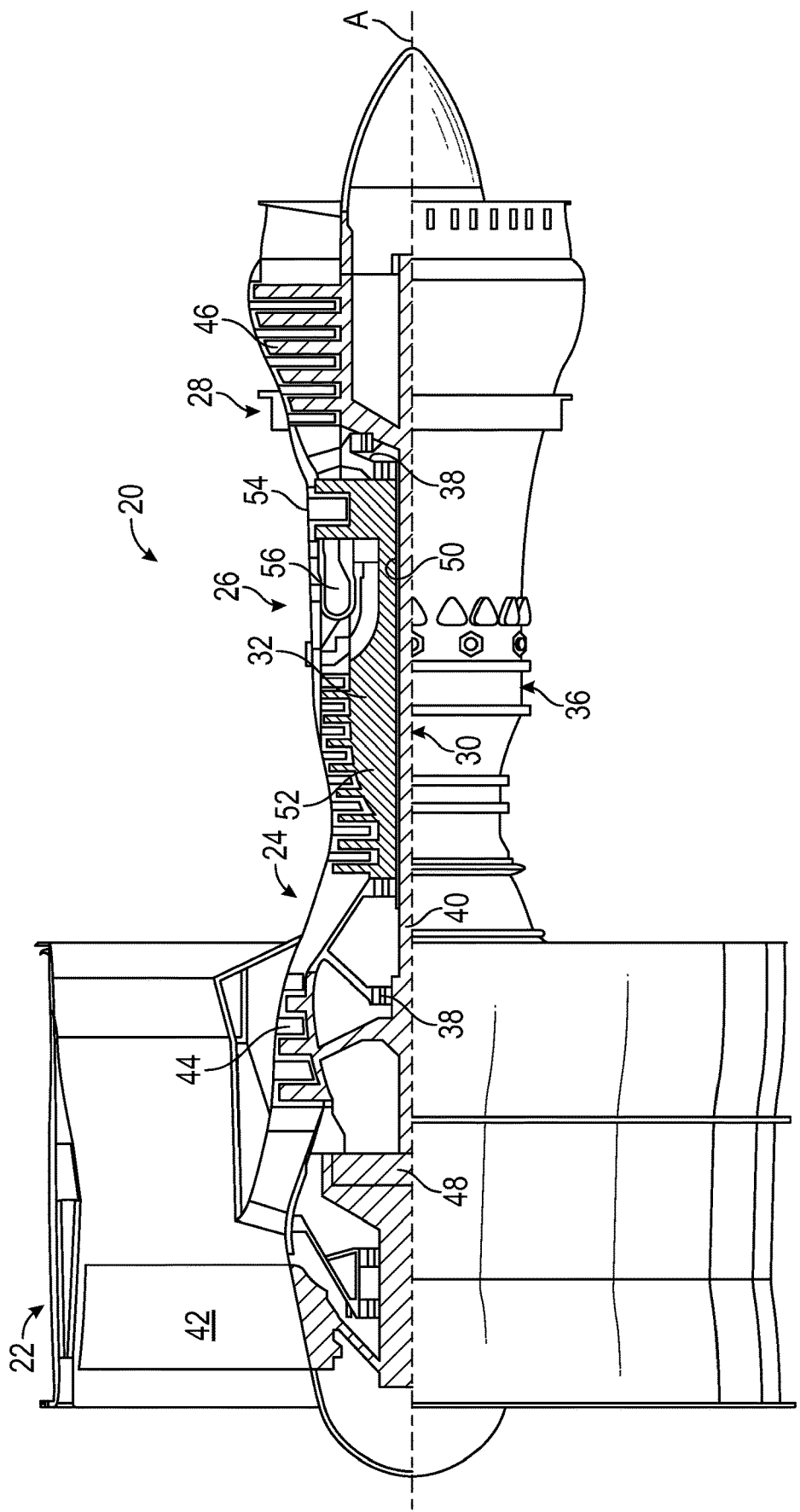
FIG. 2 is a cross-sectional diagram of a gas turbine engine of an aircraft according to one embodiment.

FIG. 1 illustrates an example of a commercial aircraft 10 having aircraft engines 20 that may embody aspects of the teachings of this disclosure. With reference to FIG. 2, an example of a gas turbine engine 20 configured for use in the aircraft 10 is illustrated schematically. The gas turbine engine 20 disclosed herein is a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path while the compressor section 24 drives air along a core flow path for compression and communication into the combustor section 26 and then expansion through the turbine section 28. Although depicted as a turbofan gas turbine engine 20 in the disclosed non-limiting embodiment, it should be understood that the concepts described herein are not limited to use with turbofans as the teachings may be applied to other types of turbine engines, such as three-spool architectures for example.

The engine 20 generally includes a low spool 30 and a high spool 32 mounted for rotation about an engine central longitudinal axis A relative to an engine static structure 36 via several bearing systems 38. It should be understood that various bearing systems 38 at various locations may alternatively or additionally be provided.

The low spool 30 generally includes an inner shaft 40 that interconnects a fan 42, a low pressure compressor 44, and a low pressure turbine 46. The inner shaft 40 may be connected to the fan 42 directly or through a geared architecture 48 to drive the fan 42 at a different, typically lower, speed than the low spool 30. The high spool 32 includes an outer shaft 50 that interconnects a high pressure compressor 52 and a high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 54, 46 rotationally drive the respective low spool 30 and high spool 32 in response to the expansion.

Figure 3:
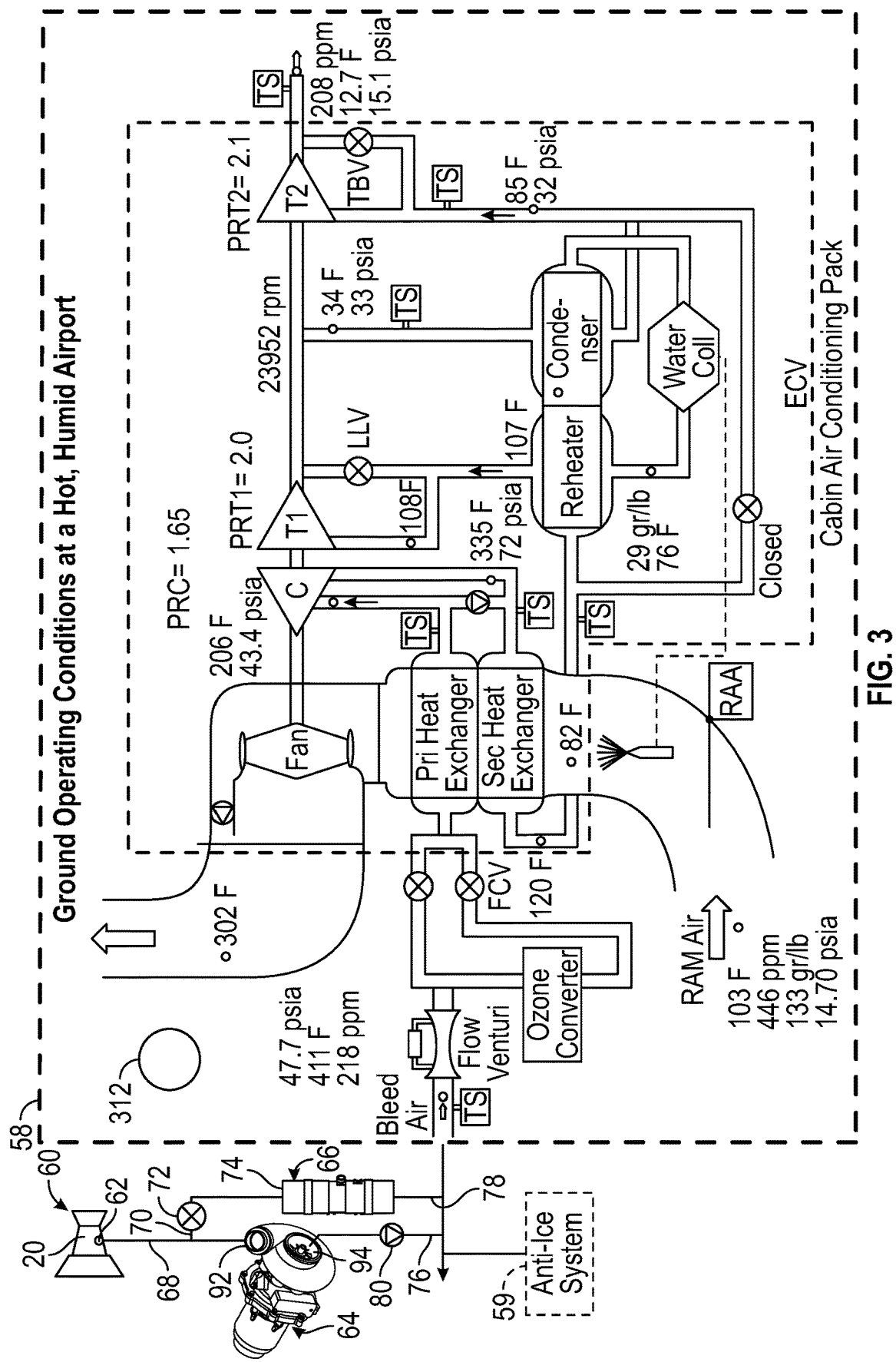
FIG. 3 is a schematic of a bleed air system for use with an aircraft engine according to one embodiment.

Referring now to FIG. 3, each engine 20 of the aircraft 10 may employ a dedicated bleed air system 60, or the plurality of engines 20 may employ a common bleed air system 60. The bleed air system 60 provides compressed or pressurized air to one or more aircraft systems such as, for example, an environmental control system, illustrated schematically at 58, to pressurize the cabin of an aircraft 10. Alternatively, or in addition, the bleed air may be used for anti-icing or deicing, heating or cooling, and/or operating pneumatic equipment, as illustrated schematically at 59.

The bleed air system 60 includes at least one port 62 for extracting air at various stages of the engine the engine 20.

In the illustrated, non-limiting embodiment, the system 60 includes one or more ports 62 configured to bleed low pressure air from a portion of the low pressure spool 30, such as the low pressure compressor 44 for example. The air drawn from the port 62 may have a maximum temperature of about 800° F. and a maximum pressure of about 150 psia. However, embodiments where the port 62 is located at another low pressure position, or alternatively, is configured to draw high pressure bleed air are also contemplated herein.

The bleed air system 60 additionally includes a turbo-generator 64 and a boost compressor 66. A first bleed passage 68 fluidly couples the port 62 to the turbo-generator 64, and a second bleed passage 70 fluidly couples the port 62 to the boost-compressor 66. In the illustrated, non-limiting embodiment, the second bleed passage 70 extends from the first bleed passage 68 upstream from the turbo-generator 64. An isolation valve 72 may be disposed within the second passage 70 upstream from the inlet 74 of the boost compressor 66. The isolation valve 72 may be selectively operable to control a flow of bleed air to the boost-compressor 66. It should be understood that the system 60 illustrated and described herein is intended as an example only, and embodiments of the bleed system 60 where the first bleed passage 68 and the second bleed passage 70 are not arranged in fluid communication are also within the scope of the disclosure.

As previously described, the bleed air output from both the turbo-generator 64 and the boost-compressor 66 may be provided to any of a number of aircraft systems 58, 59. In an embodiment, as shown, the outlet passages 76, 78 extending from the turbo-generator 64 and the boost-compressor 66, respectively, may be fluidly coupled. In such embodiments, a one way check valve 80 is positioned downstream from the turbo-generator 64, but upstream from the interface between the outlet passages 76, 78. The check valve 80 is configured to prevent the flow of bleed air from the outlet of the compressor 66 from flowing through the outlet passages 76, 78 towards the turbo-generator 64.

Depending on the demands of the aircraft 10, bleed air from the port 62 is selectively provided to one of the turbo-generator 64 and the boost compressor 66. For example, when the energy of the bleed air drawn at port 62 is greater than the demands of the one or more of the aircraft systems 58, 59, the air is supplied to the turbo-generator 64. The turbo-generator 64 is configured to reduce the pressure and/or the temperature of the air provided thereto from the bleed port 62. In an embodiment, the turbo-generator 64 is configured to reduce the temperature of the bleed air to less than 450° F. and reduce the pressure of the bleed air to less than 50 psia.

Figure 4:
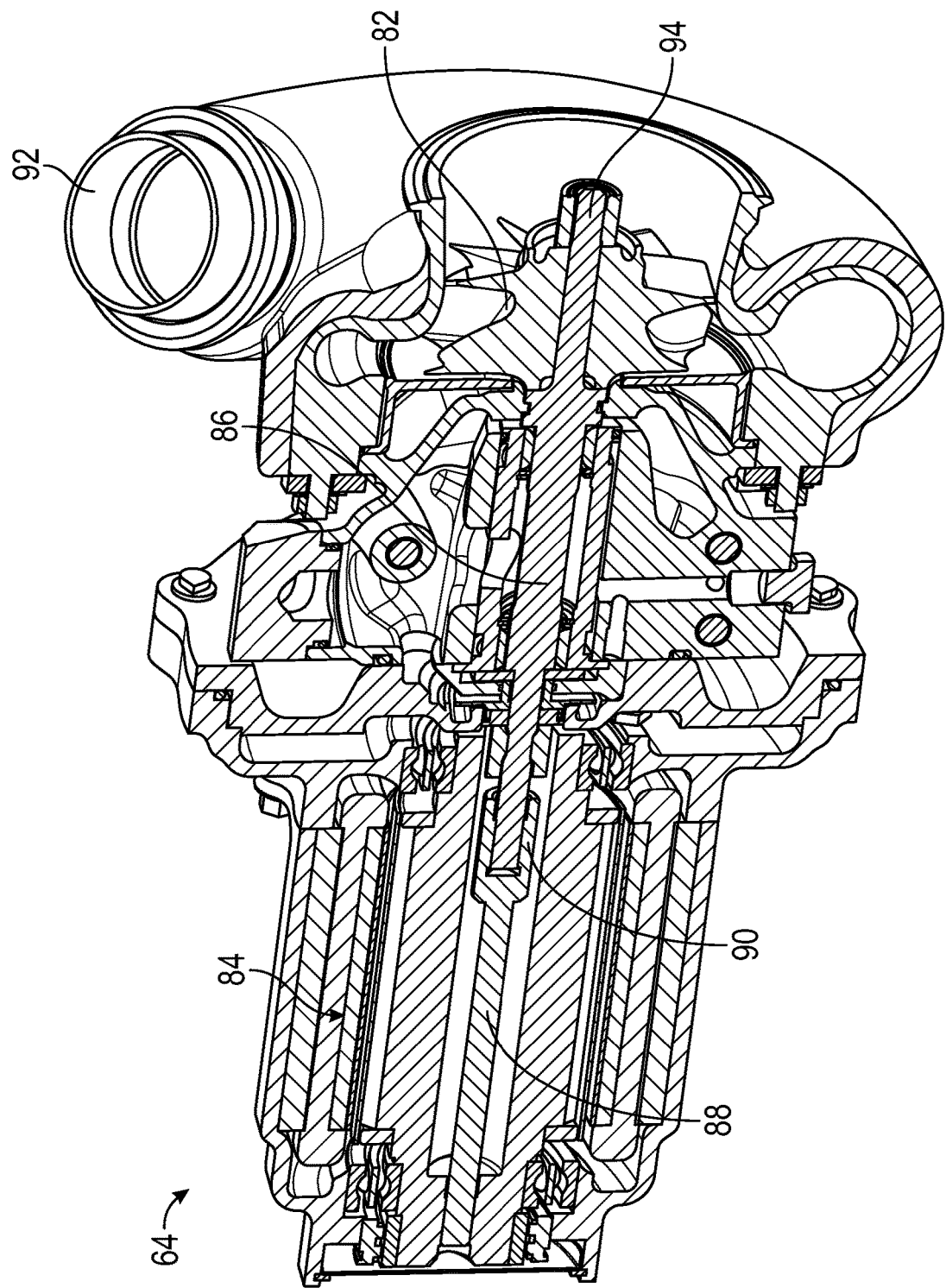
FIG. 4 is a cross-sectional diagram of an example of a turbo-generator of the bleed air system according to an embodiment.

An example of a turbo-generator 64 for use in the bleed air system 60 is illustrated in more detail in FIG. 4. The turbo-generator 64 includes a turbine 82 that directly drives an electric generator 84. In the illustrated, non-limiting embodiment, the turbine 82 is mounted on a shaft 86 and the electric generator 84 includes a shaft 88. A coupler 90, separate from or integrally formed with one of the shafts 86, 88, operably couples the turbine shaft 86 and the generator shaft 88 such that rotation of the turbine shaft 86 is transmitted to the generator shaft 88. Rotation of the turbine 82, driven by the flow of bleed air provided at an inlet opening 92, drives rotation of the generator shaft 88. Accordingly, rotation of the turbine 82 extracts energy from the bleed air and converts it into electrical energy via the generator 84. The energy created at the generator 84 may be stored, or alternatively, may be sent to an aircraft bus (not shown) where it is then supplied to one or more electrical loads of the aircraft 10.

The operational parameters of the turbo-generator 64 may be varied to achieve a desired reduction in not only pressure, but also temperature of the bleed air. For example, if the temperature of the bleed air requires cooling, the current flow from the generator 84 may be increased causing the generator 84 to develop more input torque. The increased torque will result in slower rotation of the turbine 82 causing more energy to be extracted from the bleed air before exiting from an outlet 94 of the turbo-generator 64.

When the pressure of the bleed air drawn from port 62 is less than the pressure demands of the aircraft systems 58, 59, such as when the aircraft 10 is on the ground and the engines 20 are idling or during descent for example, the isolation valve 72 is opened and the bleed air is provided to the boost compressor 66.

Figure 5:
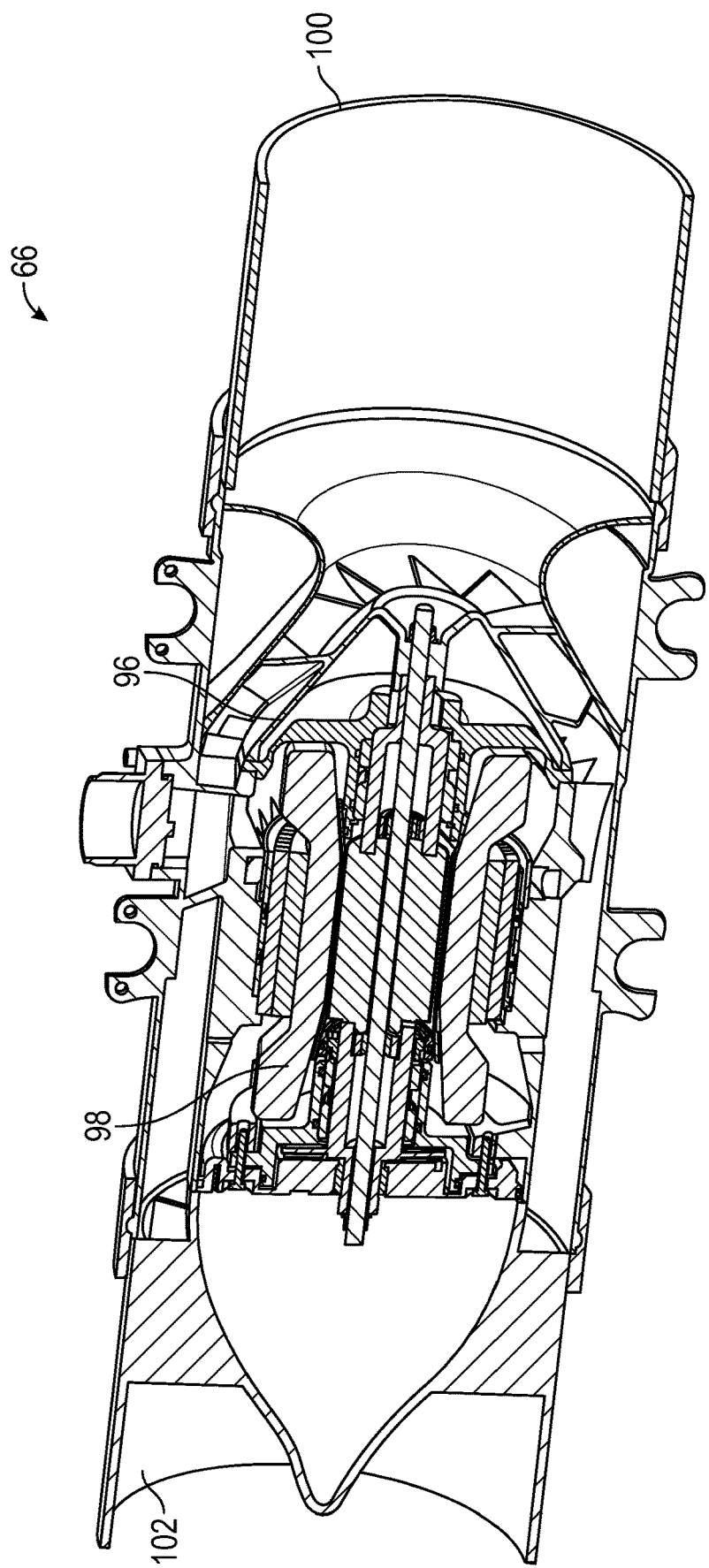
FIG. 5 is a cross-sectional diagram of an example of a boost compressor of the bleed air system according to an embodiment.

An example of a boost compressor 66 of the bleed air system 60 is illustrated in more detail in FIG. 5. The boost compressor 66 includes a compressor 96 coupled to a high temperature motor 98. The boost compressor 66 is configured to add energy to the bleed air when needed and to increase the pressure and/or temperature of the bleed air. As the bleed air passes from the inlet 74 to the outlet of the boost compressor 66, electrical energy, such as supplied by the aircraft bus for example, is used to operate the motor 98 of the boost compressor 66. The electrical energy is converted into pneumatic energy which is then added to the low pressure bleed air within the boost compressor 66.

The bleed air system illustrated and described herein eliminates the need for bleed air hardware including valves and a pre-cooler, thereby increasing the reliability of the bleed air system. Further, by capturing excess energy of the bleed air, the bleed air system 60 which further increases the fuel efficiency of the aircraft.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Also, in the drawings and the description, there have been disclosed embodiments of the invention and, although specific terms may have been employed, they are unless otherwise stated used in a generic and descriptive sense only and not for purposes of limitation, the scope of the invention therefore not being so limited. Moreover, the use of the terms first, second, etc., do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of operating an engine bleed air system of an aircraft, the engine bleed air system comprising at least one aircraft system, the at least one aircraft system comprising an environmental control system having a cabin air conditioning pack, the cabin air conditioning pack comprising a first compressor and a first turbine, the engine bleed air system further comprising a port for extracting bleed air from a compressor section of an engine, a turbo-generator fluidly coupled to the port and positioned along a first bleed air passage, the turbo-generator having a turbine and a generator, the generator being driven by rotation of the turbine, the engine bleed air system further comprising a boost compressor fluidly coupled to the port and positioned along a second bleed air passage such that the boost compressor and the turbo-generator are disposed in parallel along the first and second bleed air passages, wherein the boost compressor is not configured to be driven by, or rotationally coupled to, the turbo-generator, and wherein bleed air extracted by the port is selectively provided to at least one of the turbo-generator or the boost compressor based on a demand of the at least one aircraft system, the boost compressor and turbo-generator being positioned between the port and the at least one aircraft system, with respect to a bleed air flow from the port to the at least one aircraft system, such that the first and second bleed air passages are connected to the at least one aircraft system and are configured to direct bleed air from the turbo-generator and the boost compressor to the at least one aircraft system, the method comprising:

determining the demand of the at least one aircraft system;

extracting bleed air from an engine via the port;

providing the bleed air to the turbo-generator if an energy of the bleed air is greater than the demand of the at least one aircraft system; and providing the bleed air to the boost compressor if the energy of the bleed air is less than the demand of the at least one aircraft system.

2. The method of claim 1, further comprising operating an isolator valve to selectively control a flow of the bleed air to the turbo-generator and the boost compressor.

3. An engine bleed air system for an aircraft, the engine bleed air system comprising:

at least one aircraft system, the at least one aircraft system comprising an environmental control system having a cabin air conditioning pack, the cabin air conditioning pack comprising a first compressor and a first turbine;

a port for extracting bleed air from a compressor section of an engine;

a turbo-generator fluidly coupled to the port and positioned along a first bleed air passage, the turbo-generator having a turbine and a generator, the generator being driven by rotation of the turbine; and a boost compressor fluidly coupled to the port and positioned along a second bleed air passage such that the boost compressor and the turbo-generator are disposed in parallel along the first and second bleed air passages, wherein the boost compressor is not configured to be driven by, or rotationally coupled to, the turbo-generator, and wherein bleed air extracted by the port is selectively provided to at least one of the turbo-generator or the boost compressor based on a demand of the at least one aircraft system, the boost compressor and turbo-generator being positioned between the port and the at least one aircraft system, with respect to a bleed air flow from the port to the at least one aircraft system, such that the first and second bleed air passages are connected to the at least one aircraft system and are configured to direct bleed air from the turbo-generator and the boost compressor to the at least one aircraft system.

4. The engine bleed air system of claim 3, wherein the port is configured to draw air having a pressure less than about 150 psia from the engine.

5. The engine bleed air system of claim 4, wherein the engine includes a low pressure spool and a high pressure spool, a pressure at the lower pressure spool being lower than a pressure at the high pressure spool, wherein the port is configured to bleed air from the low pressure spool of the engine.

6. The engine bleed air system of claim 3, wherein the engine bleed air system is capable of directing the bleed air to the turbo-generator when an energy of the bleed air is greater than the demand of the at least one aircraft system.

7. The engine bleed air system of claim 6, wherein the turbo-generator is configured to reduce at least one of a pressure or a temperature of the bleed air.

8. The engine bleed air system of claim 6, wherein the turbo-generator is configured to extract energy from the bleed air and convert the extracted energy into electrical energy via the generator.

9. The engine bleed air system of claim 8, wherein the generator is configured to supply the electrical energy to one or more electrical loads.

10. The engine bleed air system of claim 3, wherein the engine bleed air system is capable of directing the bleed air to the boost compressor when an energy of the bleed air is less than the demand of the at least one aircraft system.

11. The engine bleed air system of claim 9, wherein the boost compressor is configured to add energy to the bleed air.

12. The engine bleed air system of claim 10, wherein the boost compressor is configured to convert electrical energy into pneumatic energy and add the pneumatic energy to the bleed air.

13. The engine bleed air system of claim 9, wherein the boost compressor is configured to increase at least one of a temperature or a pressure of the bleed air.

14. The engine bleed air system of claim 3, wherein the at least one aircraft system further includes an anti-icing system.

15. The engine bleed air system of claim 3, further comprising an isolator valve disposed upstream from the boost compressor, the isolator valve being operable to control a flow of bleed air to the turbo-generator and the boost compressor.

16. The engine bleed air system of claim 3, further comprising a one way check valve disposed downstream from an outlet of the turbo-generator and upstream from an interface between the first bleed air passage and the second bleed air passage.

* * * * *